(12) United States Patent
Zhu

(10) Patent No.: US 7,522,904 B1
(45) Date of Patent: Apr. 21, 2009

(54) CUSTOMER PREMISES EQUIPMENT ALTERNATE PATH ARCHITECTURE FOR CONFIGURATION AND TROUBLESHOOTING

(75) Inventor: Kevin Zhu, Overland Park, KS (US)

(73) Assignee: Sprint Communications Company LP, Overland Park, KS (US)

(*) Notice: Subject to any disclaimer, the term of this patent is extended or adjusted under 35 U.S.C. 154(b) by 503 days.

(21) Appl. No.: 11/222,717

(22) Filed: Sep. 9, 2005

(51) Int. Cl.
*H04Q 7/00* (2006.01)

(52) U.S. Cl. ............... 455/403; 455/423; 455/414.1; 455/426.1; 370/338; 370/395.52; 725/62; 725/111

(58) Field of Classification Search ............... 455/403, 455/414.1, 3.01, 445, 426.1–426.2, 550.1, 455/557, 560–561, 423; 370/310, 328, 338, 370/352, 485–487, 395.52–395.53; 726/62, 726/105–112, 64
See application file for complete search history.

(56) References Cited

U.S. PATENT DOCUMENTS

| | | | |
|---|---|---|---|
| 6,807,564 B1* | 10/2004 | Zellner et al. | 709/206 |
| 6,930,598 B2* | 8/2005 | Weiss | 340/531 |
| 7,129,855 B2* | 10/2006 | Krzyzanowski et al. | 340/825.72 |
| 7,260,383 B1* | 8/2007 | Ngan | 455/412.1 |
| 2005/0005190 A1* | 1/2005 | Ofir et al. | 714/4 |
| 2005/0113069 A1* | 5/2005 | Knauerhase et al. | 455/411 |
| 2005/0240680 A1* | 10/2005 | Costa-Requena et al. | 709/250 |
| 2006/0025151 A1* | 2/2006 | Karaoguz et al. | 455/455 |
| 2006/0034311 A1* | 2/2006 | Kaplan et al. | 370/420 |
| 2006/0121853 A1* | 6/2006 | Madhavan et al. | 455/63.1 |
| 2006/0291419 A1* | 12/2006 | McConnell et al. | 370/331 |
| 2006/0294208 A1* | 12/2006 | Adams et al. | 709/220 |
| 2007/0041554 A1* | 2/2007 | Newman et al. | 379/218.01 |
| 2008/0095344 A1* | 4/2008 | Jachner | 379/133 |

OTHER PUBLICATIONS

"Technical Report—DSL Forum TR-069-CPE WAN Management Protocol," May 2004, 109 pgs.

* cited by examiner

*Primary Examiner*—Kamran Afshar

(57) ABSTRACT

A communication system is provided. The communication system includes a customer premises equipment, a wireless device, and a configuration server. The customer premises equipment can provide communication services to a local area network and can also communicate with the Internet. The wireless device has access to the Internet and can communicate with the customer premises equipment. The configuration server has access to the Internet and can communicate with the customer premises equipment to configure and maintain the customer premises equipment via a first path that includes the Internet and a modem and via a second path that includes the Internet and the wireless device.

20 Claims, 4 Drawing Sheets

CUSTOMER PREMISES EQUIPMENT ALTERNATE PATH ARCHITECTURE FOR CONFIGURATION AND TROUBLESHOOTING

CROSS-REFERENCE TO RELATED APPLICATIONS

None

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to communications systems, and more particularly, but not by way of limitation, to a system and method of customer premises equipment alternate path architecture for configuration and troubleshooting.

BACKGROUND OF THE INVENTION

The internet protocol (IP) is a network layer protocol that defines the addressing and routing structure of the Internet. IP may be considered to control communications between two directly linked machines, while a transport layer protocol such as the transport control protocol (TCP) or the user datagram protocol (UDP) controls the end-to-end network communications, for example flow control. Various communications services are beginning to be carried over IP as application layer services, for example voice-over-IP (VoIP) and IP television (IPTV). Voice-over-IP denominates voice traffic distributed and carried over the Internet, the encoded voice carried as a data portion of the packetized communication. IPTV denominates systems in which television and/or video signals are distributed using a broadband Internet connection using IP.

In a home environment or small business environment, a home gateway device may provide a desired mapping or conversion between a broadband modem having a connection to the Internet and one or more IP terminals, for example an IP telephone or an IPTV television. The home gateway may be a minimally featured device to keep price points low. The home gateway may desirably be configured to provide various communications services, for example the voice-over-IP and/or the IPTV communication services, from a configuration server located at a location remote from the home gateway. The configuration server may be operated by a communications carrier or service provider, where the communications carrier or service provider provides the subject communication service, for example voice-over-IP and/or IPTV communication services, to a subscriber or customer.

SUMMARY OF THE INVENTION

In one embodiment, a communication system is provided. The communication system includes a customer premises equipment, a wireless device, and a configuration server. The customer premises equipment can provide communication services to a local area network and can also communicate with the Internet. The wireless device has access to the Internet and can communicate with the customer premises equipment. The configuration server has access to the Internet and can communicate with the customer premises equipment to configure and maintain the customer premises equipment via a first path that includes the Internet and a modem and via a second path that includes the Internet and the wireless device.

In another embodiment, a method of maintaining a customer premises equipment is provided. The method includes establishing communication between a configuration server and a wireless device via the Internet, establishing communication between the wireless device and the customer premises equipment, and changing a parameter of the customer premises equipment, where the change is initiated by the configuration server.

In yet another embodiment, a communication system including a customer premises equipment, a wireless device, and a configuration server is provided. The customer premises equipment can provide at least one broadband communication service based on an Internet connection. The wireless device can provide an alternate communication path between the customer premises equipment and the Internet for maintenance of the customer premises equipment. The configuration server can establish the alternate communication path and maintain the customer premises equipment via the alternate communication path.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

Figure 1:
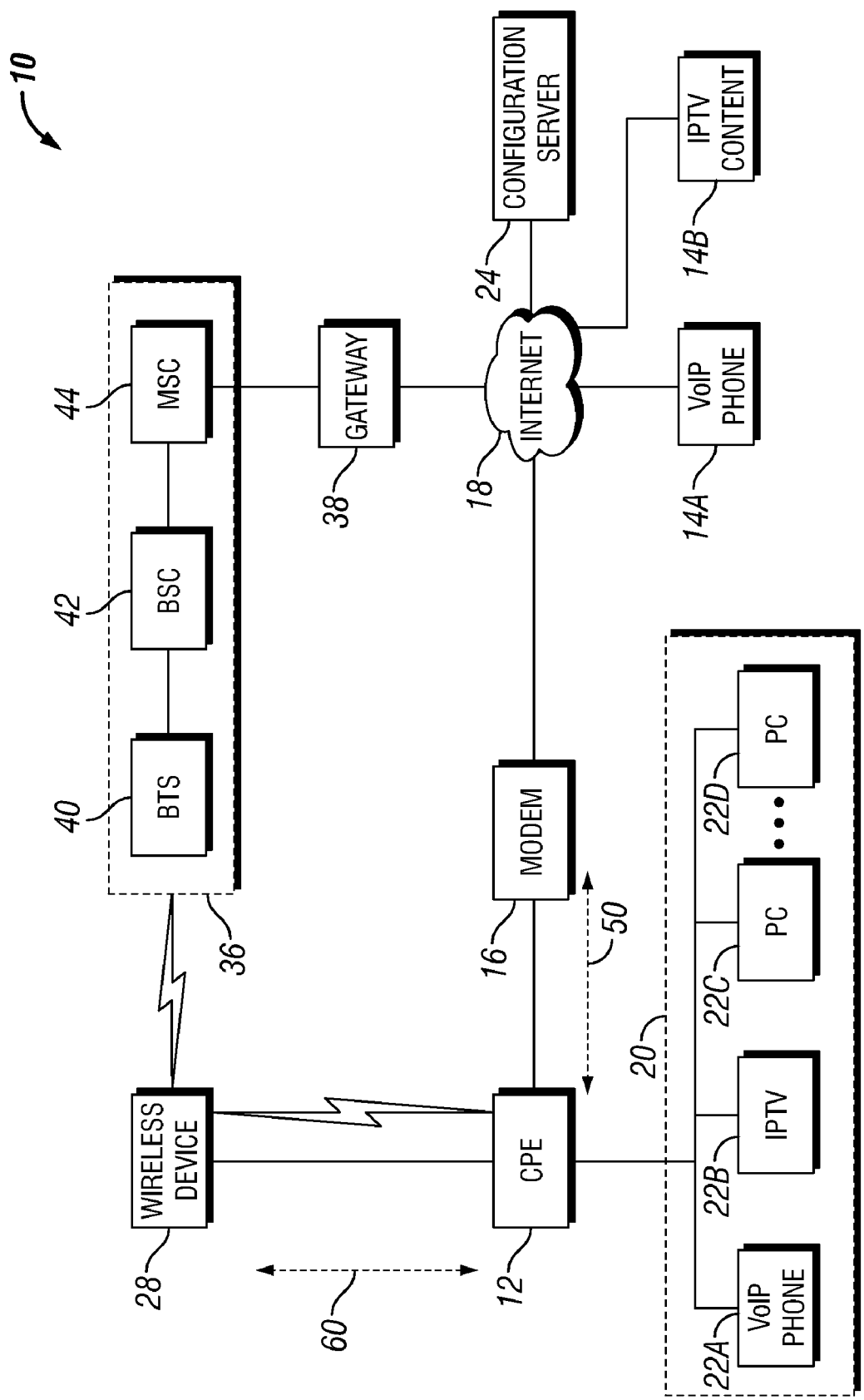
FIG. 1 is a block diagram that depicts a communication system according to an embodiment of the present disclosure.

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

Customer premises equipment (CPE) includes various home and business communication devices which may be purchased and installed by subscribers. CPE is distinguished from equipment owned and operated by communications network operators, referred to as operators or carriers. A CPE may be initially configured and subsequently maintained by a configuration server located remote from the CPE, for example in a carrier or service provider facility. Initial configuration of the CPE may include setting parameters of the CPE to enable it to provide otherwise dormant services, for example voice-over-IP communication services. This setting of parameters or other initializations may be referred to as provisioning the CPE. Maintenance of the CPE may include, but is not limited to, installing additional software onto the CPE, for example updates of previously installed software or new software to add new services to the CPE. Maintenance of the CPE may also include running diagnostics on the CPE to identify the cause of a fault of the CPE and changing parameter settings to fix the CPE and return it to normal operation.

The CPE, for example a home gateway or other device, may have communication access to the Internet or have a communication link to the Internet through a broadband modem or other modem or system. When first installed, the CPE may register with a configuration server via the broadband modem and the Internet. The configuration server may then provision the CPE appropriately, based on a service agreement of the subscriber associated with the CPE, and bring the CPE into operation.

In some cases the CPE may be unable to establish communication to the configuration server after installation. Alternatively, at some later time the CPE may experience a failure or diminishment of service. These problems may result, for example, but not limited to, from a hostile modem that is provided by a vendor in competition with the vendor of the CPE. In another case, the problems may result from firewall software in the modem that erroneously excludes communication from the configuration server, but not from other sources. To resolve such problems, for example, it may be desirable for the configuration server to provide maintenance of the CPE or to enable new or different services. In other cases, the subscriber may have no option but to return the CPE to the vendor for service and/or configuration.

The following disclosure describes a novel alternative communication path provided by a device having a wireless connection to the Internet and able to bridge communications from the CPE to the Internet and the configuration server. In an embodiment, the alternate communication path allows the CPE to communicate with the configuration server via a wireless device, such as a mobile telephone, when a primary communication path is unavailable. This novel alternative communication path may provide a way to initially provision and thereafter maintain the CPE without returning it to the vendor, thereby improving the product experience of the subscriber.

Turning now to FIG. 1, a block diagram of a communication system 10 is depicted. The communication system 10 includes a CPE 12 in communication with IP devices 14 via a broadband modem 16 that provides a connection to an Internet 18. The IP devices 14, for example a voice-over-IP telephone 14a and/or an IPTV content source 14b, are connected to the Internet 18. The Internet 18 may also refer to or include partially or totally private networks or dedicated networks such as, but not limited to, virtual private networks (VPN) or other data or telecommunication networks. The broadband modem 16 may be a digital subscriber line (DSL) modem, a cable modem, or other broadband modem device. In an embodiment, the CPE 12 is a home gateway, but in other embodiments the CPE 12 may be a different communication device. The CPE 12 provides communication services to a local area network (LAN) 20. The LAN 20 may include service terminals 22 that receive the communication services, for example a voice-over-IP telephone 22a, an IPTV television 22b, and/or one or more personal computers 22c, 22d. In an embodiment, the LAN 20 may include other types of service terminals or systems that receive communication services from the CPE 12.

In an embodiment, the CPE 12 may register with a configuration server 24 during a first initialization of the CPE 12 via the broadband modem 16 and the Internet 18. The communication path from the CPE 12 to the broadband modem 16 to the Internet 18 to the configuration server 24 may be referred to as the primary communication path 50. While the primary communication path 50 is depicted by an arrow pointing between the CPE 12 and the modem 16, it should be understood that the primary communication path 50 continues through the Internet 18 to the configuration server 24. The configuration server 24 may respond to the registration of the CPE 12 by sending messages and/or commands to the CPE 12 over the primary communication path 50 that set parameters of the CPE 12 and/or provision the CPE 12 to provide one or more communication services.

In an embodiment, the configuration server 24 may send messages to the CPE 12 over the primary communication path 50 to install software on the CPE 12, for example software that provides communication services such as voice-over-IP. The configuration server 24 may subsequently exchange messages with the CPE 12 over the primary communication path 50, for example, to perform maintenance or for other reasons. For example, the configuration server 24 may exchange messages with the CPE 12 over the primary communication path 50 to run diagnostics on the CPE 12 and to set parameters of the CPE 12 to restore the CPE 12 to an operational condition. The maintenance may be initiated by a subscriber, for example when the subscriber reports a service outage to the service provider or carrier who provides the subject communication service and operates and manages the configuration server 24, or the maintenance may be otherwise initiated.

In an embodiment, the communication system 10 includes a wireless device 28 that is operable to provide an alternate communication path 60 from the CPE 12 to the configuration server 24. The alternate communication path 60 runs from the CPE 12 to the wireless device 28 to a telecommunications network 36 to a gateway 38 to the Internet 18 to the configuration server 24. While the alternate communication path 60 is depicted by an arrow pointing between the CPE 12 and the wireless device 28, it should be understood that the alternate communication path 60 continues through the telecommunications network 36, the gateway 38, and the Internet 18 to the configuration server 24. The wireless device 28 may be said to bridge communications from the CPE 12 to the configuration server 24. The alternate communication path 60 may be employed, for example, when the CPE 12 is unable to communicate with the configuration server 24 using the primary communication path 50.

As used herein, the term 'wireless device' refers to any device with at least one wireless communication mode. For example, the wireless device 28 might be a mobile telephone, a BlackBerry®-type device, a laptop computer, or a similar mobile telecommunications device. The wireless device 28 might also be a fixed-location device that has at least one wireless communication mode and a wired communication mode. For example, the wireless device 28 might be a component of the CPE 12 such as a card installed in a slot on the CPE 12.

The telecommunications network 36, for example, may comprise a base transceiver station (BTS) 40, a base station controller (BSC) 42, and a mobile switching center (MSC)

44. As is well known to those skilled in the art, the BTS 40 may provide radio links to mobile devices, for example the wireless device 28, may control radio transmission power levels, for example based on pilot signal transmissions from the BTS 40, and links the mobile devices to the wired networks via the BSC 42. The BSC 42 may link multiple BSCs 42 to the MSC 44. The MSC 44 may link multiple BSCs 42 to the wired networks, for example to the public switched telephone network (PSTN) (not shown) and/or to the Internet 18, for example through the gateway 38. In an embodiment, the wireless device 28 may communicate with the telecommunications network 36 using a global system for mobile communications (GSM), a code division multiple access (CDMA), a time division multiple access (TDMA), or other wireless communication protocol that is well known to those skilled in the art.

In an embodiment, the wireless device 28 is a mobile device such as a mobile telephone with Internet connection capabilities, a personal digital assistant (PDA), or a BlackBerry®-type device, as examples. In this case, the wireless device 28 might wirelessly communicate with the CPE 12 using a wireless communication protocol such as the IEEE-802.11 wireless protocol (also referred to as WiFi), the Bluetooth wireless protocol, an infrared-based protocol, or another wireless protocol.

In another embodiment, the wireless device 28 is a fixed device. That is, communication between the wireless device 28 and the CPE 12 occurs via a cable, coaxial cable, wires, wave guide, or other transmission line. Such communications may employ the RS-232 protocol, the RS-422 protocol, the IEEE-1391 protocol (also referred to as firewire), or another communication protocol.

In yet another embodiment, the CPE 12 and the wireless device 28 may be capable of communicating with each other using either a wireless communication protocol or a communication protocol based on using a cable, coaxial cable, wires, wave guide, or another transmission line. Such communication may employ IEEE-802.11 (WiFi), Bluetooth, RS-232, RS-422, IEEE-1391 (firewire), or another communication protocol.

Figure 2A:
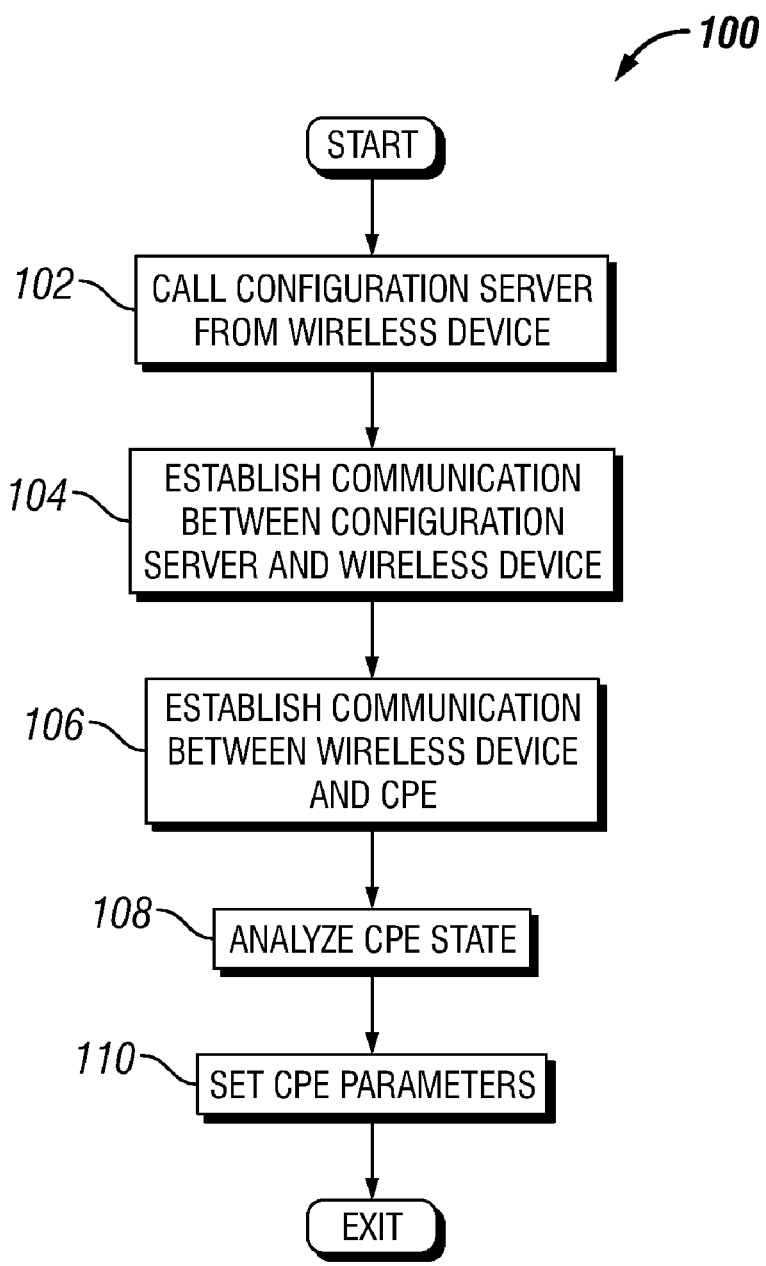
FIG. 2A is a flow diagram that depicts a process of using the communication system according to an embodiment of the present disclosure.

Turning now to FIG. 2A, a flow diagram illustrates a process 100 of using the communication system 10. The process 100 starts at block 102 where the wireless device 28 is employed to call the carrier or service provider that operates the configuration server 24, which may be referred to as calling the configuration server 24. The call is directed to alerting the carrier or service provider that the CPE 12 desires maintenance or other initialization or service, indicating that the primary communication path 50 is not available, and providing any information the configuration server 24 may need to establish the alternate communication path 60, for example an IP address of the wireless device 28. Alternatively, the IP address of the CPE 12 may be stored by the configuration server 24 during a registration operation completed on the first initialization of the CPE 12.

The process 100 proceeds to block 104 where the configuration server 24 establishes communication between the configuration server 24 and the wireless device 28. The process 100 proceeds to block 106 where the wireless device 28 establishes communication between the wireless device 28 and the CPE 12, thereby bridging communication from the configuration server 24 to the CPE 12.

The process 100 proceeds to block 108 where the configuration server 24 analyzes the state of the CPE 12. This may include running diagnostics remotely from the configuration server 24, for example sending a sequence of messages from the configuration server 24 to the CPE 12 via the alternate communication path 60 that command actions to be taken by the CPE 12 or request information to be returned. This may include analyzing responses sent from the CPE 12 to the configuration server 24 over the alternate communication path 60. The configuration server 24 might also trigger a diagnostic program already loaded on the CPE 12 and may simply receive outputs from the diagnostic program.

The process 100 proceeds to block 110 where the configuration server 24 sends one or more commands over the alternate communication path 60 that set one or more parameters on the CPE 12 and bring the CPE 12 back into service. The process 100 then exits.

Figure 2B:
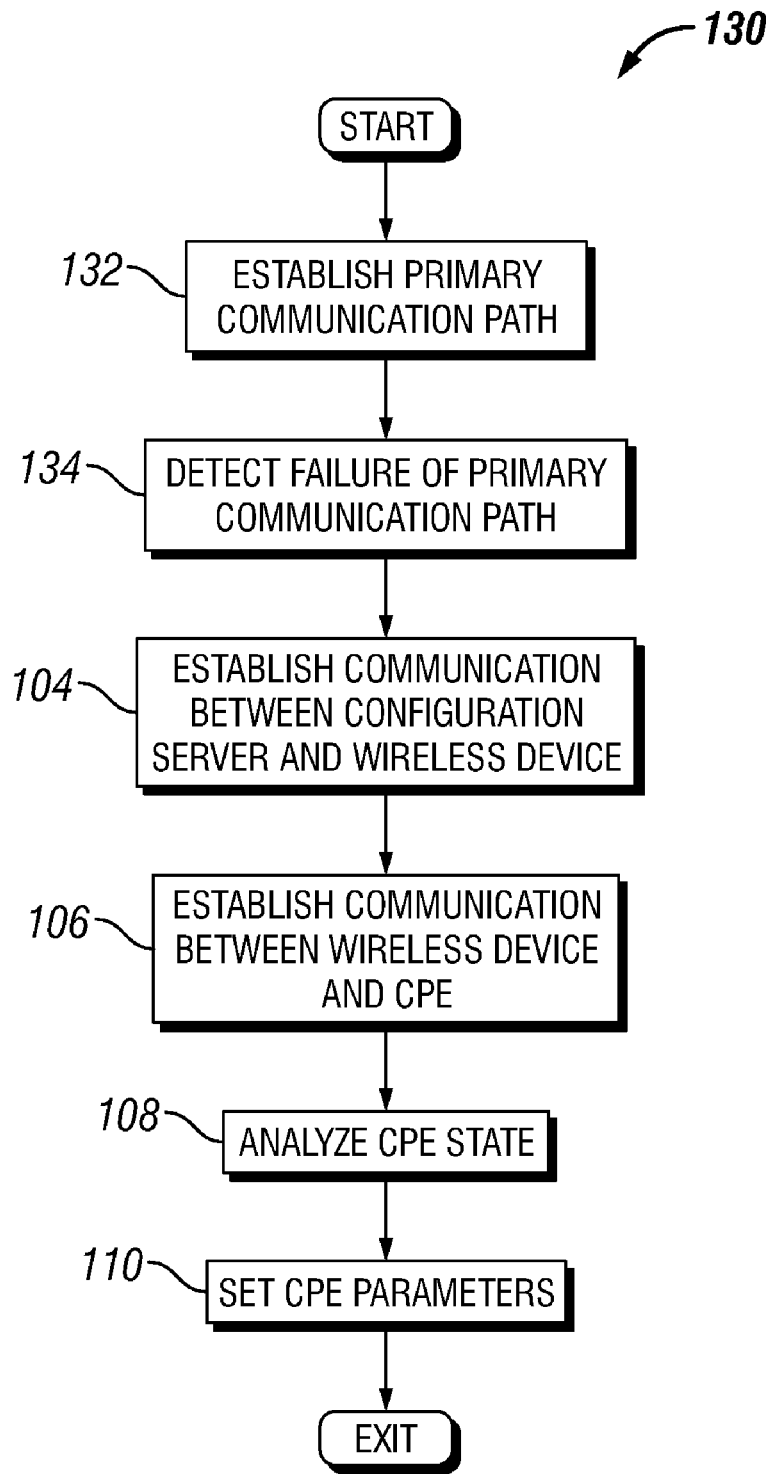
FIG. 2B is a flow diagram that depicts another process of using the communication system according to an embodiment of the present disclosure.

Turning now to FIG. 2B, a flow diagram illustrates a process 130 of using the communication system 10. The process 130 is substantially similar to the process 100 beginning with block 104. In block 132 the configuration server 24 establishes the primary communication path 50 from the configuration server 24 to the CPE 12, for example during the first initialization of the CPE 12. The process 130 proceeds to block 134 where at some later point the configuration server 24 detects a failure of the primary communication path 50 and determines to establish the alternate communication path 60. The IP address of the CPE 12 may be stored during a registration operation completed on the first initialization of the CPE 12.

The switching from the primary communication path 50 to the alternate communication path 60 and the control of the communications along the alternate communication path 60 can be managed in several ways. In one embodiment, the CPE 12 is a 'smart' device that is capable of recognizing that it needs maintenance or repair and that the primary communication path 50 is unavailable. In that case, the CPE 12 might initiate contact with the wireless device 28 and pass to the wireless device 28 any information the configuration server 24 might need to perform the maintenance or repair. The wireless device 28 would then pass the information to the configuration server 24.

In another embodiment, the CPE 12 is a 'dumb' device that is not capable of recognizing that it needs maintenance or repair or that the primary communication path 50 is unavailable. In that case, a user of the wireless device 28 might need to recognize that the CPE 12 needs maintenance or repair and that the primary communication path 50 is unavailable. The user might then initiate contact with the CPE 12 by means of the wireless device 28 and query the CPE 12 for the information the configuration server 24 might need to perform the maintenance or repair. Upon the wireless device 28 receiving the information, the user might manually send the information from the wireless device 28 to the configuration server 24 or the wireless device 28 might automatically send the information to the configuration server 24.

In another embodiment in which the CPE 12 is a 'dumb' device, the configuration server 24 might recognize that the CPE 12 needs maintenance or repair and that the primary communication path 50 is unavailable. In that case, the configuration server 24 might initiate contact with the wireless device 28 and request that the wireless device 28 retrieve from the CPE 12 any information the configuration server 24 might need to perform the maintenance or repair. Upon the wireless device 28 receiving the information, the information might be sent to the configuration server 24 manually or automatically. Other configurations for the control of the communications along the alternate communication path 60 will present themselves to one of skill in the art.

Figure 3:
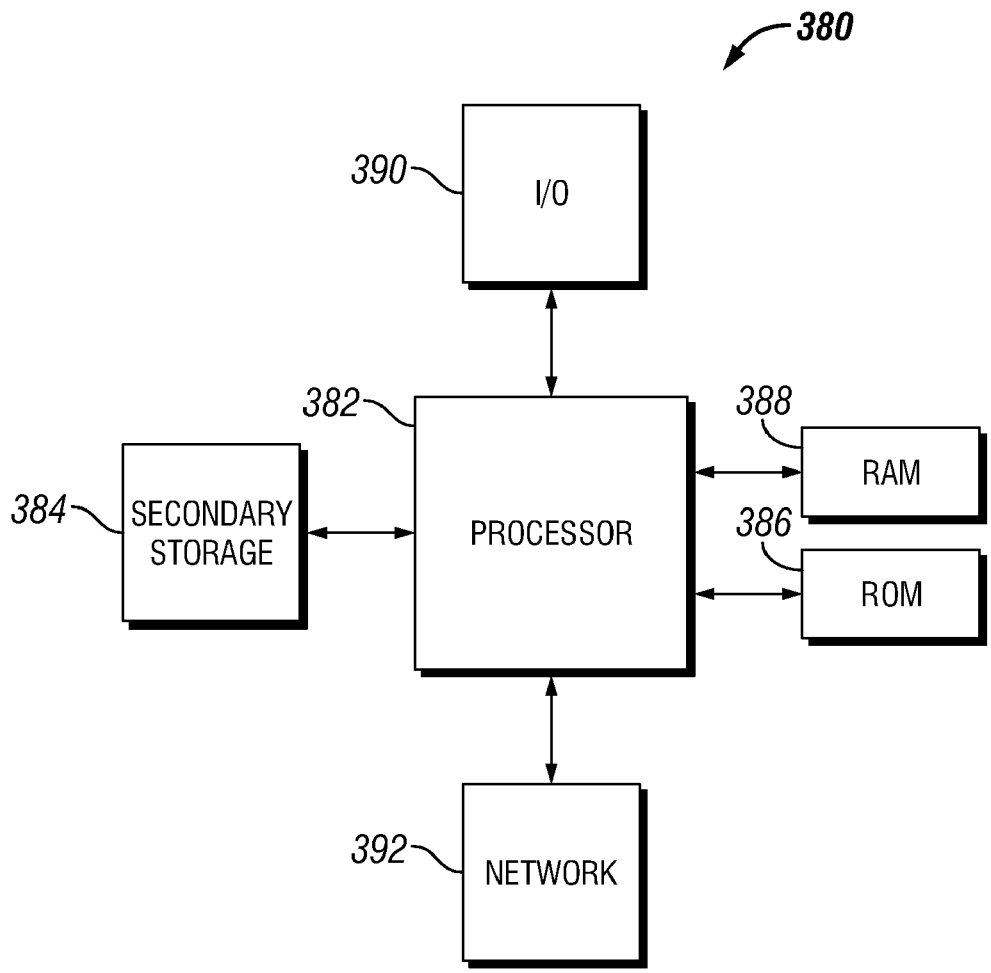
FIG. 3 illustrates an exemplary general purpose computer system suitable for implementing some of the components of the several embodiments of the disclosure.

Some of the components of the communication system 10 described above, for example the CPE 12, the configuration system 24, the gateway 38, and others, may be implemented on any general-purpose computer with sufficient processing power, memory resources, and network throughput capability to handle the necessary workload placed upon it. FIG. 3 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 392 devices may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity 392 devices may propagate in or on the surface of electrical conductors, in coaxial cables, in waveguides, in optical media, for example optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

Figure 4:
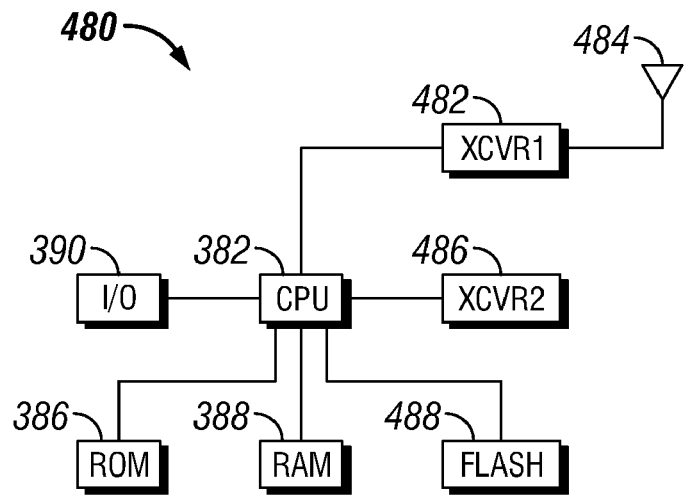
FIG. 4 illustrates an exemplary embedded computer platform suitable for implementing some of the components of the several embodiments of the disclosure.

Turning now to FIG. 4, a typical embedded computer platform 480 is illustrated. The embedded computer platform 480 is suitable for implementing the wireless device 28 described above. The embedded computer platform 480 is substantially similar to the general purpose computer 380 described above. The embedded computer platform 480 includes a first transceiver 482 and an antenna 484 operable to provide wireless communications with the telecommunications network 36. The transceiver 482 and the antenna 484 and a second transceiver 486 promote communication via the alternate communication path 60 as well as wireless communication with the CPE 12 as described above with respect to FIG. 1. The embedded computer platform 480 also includes a FLASH memory device 488 that provides fast, non-volatile, reprogrammable memory. The CPU 382 may be implemented as one or more CPUs, digital signal processor (DSP) chips, application specific integrated circuits (ASICs), programmable logic devices (PLDs), and/or field programmable gate arrays (FPGAs). The embedded computer platform 480 may be implemented as a system-on-a-chip (SOC).

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A communication system, comprising:
   a customer premises equipment having a first and a second communication path to provide at least some communication services to a local area network and communicate with the Internet;
   a wireless device having access to the Internet and further communicates with the customer premises equipment through the second communication path; and
   a configuration server having access to the Internet, the configuration server configured to communicate with the customer premises equipment to configure and maintain the customer premises equipment via the first communication path including the Internet and a modem and via the second communication path including the Internet and the wireless device.

2. The communication system of claim 1, wherein the customer premises equipment is further defined as a home gateway.

3. The communication system of claim 1, wherein the communication services are selected from the group consisting of voice over internet protocol and internet protocol television.

4. The communication system of claim 1, wherein the wireless device is selected from the group consisting of a global system for mobile communications telephone, a code division multiple access telephone, a time division multiple access telephone, and a wireless computing device operable for wireless telecommunication.

5. The communication system of claim 1, wherein communication between the customer premises equipment and the wireless device occurs using a communication protocol selected from the group consisting of IEEE-802.11, Bluetooth, RS-232, RS-422, and IEEE-1391.

6. The communication system of claim 1, wherein the modem is a broadband modem.

7. The communication system of claim 1, wherein the modem is a cable modem.

8. A method of maintaining a customer premises equipment, comprising:
  detecting a failure of a first communication path of the customer premises equipment between the customer premises equipment and a configuration server via the Internet and a modem;
  establishing a second communication path of the customer premises equipment between the customer premises equipment and the configuration server via the Internet and a wireless device; and
  maintaining the customer premises equipment via the second communication path, wherein maintaining the customer premises equipment includes changing a parameter of the customer premises equipment.

9. The method of claim 8, wherein the wireless device is selected from the group consisting of a mobile telephone including a cellular telephone, a wireless digital telephone, a personal communication system (PCS), a device operable for wireless telecommunication service including a personal digital assistant (PDA), a laptop computer, a palm-top computer.

10. The method of claim 8, wherein the communication between the wireless device and the customer premises equipment uses a communication protocol selected from the group consisting of IEEE-802.11, Bluetooth, RS-232, RS-422, and IEEE-1391.

11. The method of claim 8, wherein the changing a parameter of the customer premises equipment is at least part of adding a service capability to the customer premises equipment.

12. The method of claim 8, further including:
  analyzing the state of the customer premises equipment, the analyzing done by the configuration server communicating with the customer premises equipment via the wireless device, wherein the changing the parameter is based on the analyzing.

13. The method of claim 12, further including:
  calling from the wireless device to a service provider to request help bringing a service into operation on the customer premises equipment, the service provider responsible for operating the configuration server.

14. The method of claim 8, further including:
  detecting a failure of communication between the customer premises equipment and the configuration server via the Internet and a modem coupled to the customer premises equipment and provides Internet access to the customer premises equipment, wherein the establishing the communication between the wireless device and the customer premises equipment is initiated by the configuration server based on the detecting the failure of the customer premises equipment to communicate via the modem.

15. A communication system, comprising:
  a customer premises equipment having a main communication path and an alternate communication path that provides at least one broadband communication service based on an Internet connection;
  a wireless device that provides the alternate communication path between the customer premises equipment and the Internet for maintenance of the customer premises equipment; and
  a configuration server that establishes the alternate communication path and maintains the customer premises equipment via the alternate communication path.

16. The communication system of claim 15, wherein the broadband communication service is provided to at least one service terminal selected from the group consisting of a voice over internet protocol telephone and an internet protocol television.

17. The communication system of claim 15, wherein the customer premises equipment is a home gateway.

18. The communication system of claim 15, wherein the wireless device is selected from the group consisting of a cell phone and a fixed wireless device.

19. The communication system of claim 15, further including:
  a broadband modem in communication with the customer premises equipment, the broadband modem provides the Internet connection, wherein the configuration server further maintains the customer premises equipment via the broadband modem.

20. A communication system, comprising:
  a customer premises equipment operable to provide at least one broadband communication service based on an Internet connection;
  a wireless device operable to provide an alternate communication path between the customer premises equipment and the Internet for maintenance of the customer premises equipment; and
  a configuration server operable to establish the alternate communication path and to maintain the customer premises equipment via the alternate communication path, wherein the configuration server being operable to maintain the customer premises equipment includes setting parameters of the customer premises equipment, installing broadband communication service software on the customer premises equipment, running diagnostics on the customer premises equipment, and analyzing the results of the diagnostics on the customer premises equipment.

* * * * *